(12) United States Patent
Redl et al.

(10) Patent No.: US 9,221,996 B2
(45) Date of Patent: Dec. 29, 2015

(54) PROCESS FOR REPAIRING ROAD SURFACING SYSTEMS, IN PARTICULAR FOR OPEN-PORE ASPHALTS

(71) Applicant: BASF SE, Ludwigshafen (DE)

(72) Inventors: Franz Xaver Redl, Lemfoerde (DE); Holger Leifheit, Osnabrueck (DE); Thomas Stuehrenberg, Osnabrueck (DE); Martin Lange, Vechta (DE)

(73) Assignee: BASF SE, Ludwigshafen (DE)

( * ) Notice: Subject to any disclaimer, the term of this patent is extended or adjusted under 35 U.S.C. 154(b) by 34 days.

(21) Appl. No.: 13/686,181

(22) Filed: Nov. 27, 2012

(65) Prior Publication Data

US 2013/0183094 A1   Jul. 18, 2013

Related U.S. Application Data

(60) Provisional application No. 61/564,883, filed on Nov. 30, 2011.

(51) Int. Cl.
| | |
|---|---|
| *C09D 175/04* | (2006.01) |
| *E01C 23/06* | (2006.01) |
| *E01C 7/18* | (2006.01) |
| *C09D 195/00* | (2006.01) |

(52) U.S. Cl.
CPC .............. *C09D 175/04* (2013.01); *E01C 7/187* (2013.01); *E01C 23/06* (2013.01); *C09D 195/00* (2013.01)

(58) Field of Classification Search
USPC .......................... 404/75, 82; 427/136; 524/69
IPC ....................................................... E01C 11/005
See application file for complete search history.

(56) References Cited

U.S. PATENT DOCUMENTS

| | | | | |
|---|---|---|---|---|
| 3,179,610 | A | * | 4/1965 | Wood .............................. 524/705 |
| 3,900,687 | A | * | 8/1975 | Meader et al. ................. 428/215 |
| 4,025,683 | A | * | 5/1977 | Meader et al. ................. 428/215 |
| 4,689,268 | A | * | 8/1987 | Meader, Jr. .................... 428/413 |
| 4,877,829 | A | * | 10/1989 | Vu et al. ......................... 524/729 |
| 7,857,543 | B2 | * | 12/2010 | Troster .............................. 404/1 |

FOREIGN PATENT DOCUMENTS

| | | |
|---|---|---|
| CA | 2 236 499 A1 | 11/1999 |
| JP | 2-88802 * | 3/1990 |
| WO | WO 2010/043644 A1 | 4/2010 |

\* cited by examiner

*Primary Examiner* — Gary Hartmann
(74) *Attorney, Agent, or Firm* — Oblon, McClelland, Maier & Neustadt, L.L.P.

(57) ABSTRACT

The present invention relates to a process for repairing top layers for roads, tracks, and other areas used by traffic, by applying an amount of at least 20 g/m² of a polymeric material to the damaged site, applying an amount of at least 80 g/m² of a first polyurethane reaction mixture (which can comprise additives) to the polymeric material, and applying, to the first polyurethane reaction mixture, a mixture comprising mineral aggregate and a second polyurethane reaction mixture, and allowing the material to harden. The present invention further relates to a repair kit for repairing top layers for roads, tracks, and other areas used by traffic.

19 Claims, No Drawings

PROCESS FOR REPAIRING ROAD SURFACING SYSTEMS, IN PARTICULAR FOR OPEN-PORE ASPHALTS

BRIEF DESCRIPRION OF THE INVENTION

The present invention relates to a process for repairing top layers for roads, tracks, and other areas used by traffic, by applying an amount of at least 20 g/m$^2$ (grams per square meter) of a polymeric material to the damaged site, applying an amount of at least 80 g/m$^2$ of a first polyurethane reaction mixture to the polymeric material, and applying, to the first polyurethane reaction mixture, a mixture comprising mineral aggregate and a second polyurethane reaction mixture, and allowing the material to harden. The present invention further relates to a repair kit for repairing top layers for roads, tracks, and other areas used by traffic.

Heavy traffic, or the effects of weathering, often cause(s) defects in road surfacing systems, examples being binder loss and potholes. If the intention is to avoid complete renovation of the top layer, another possibility is to repair the defects by filling. The usual method for this is what is known as the hot-mix method using bitumen-bound mineral aggregates, or what is known as the cold-mix method, using solvent-containing or emulsified bitumen and mineral aggregates. There are also approaches that use plastics-based mixtures with mineral aggregates.

BACKGROUND

In this context, CA 2236499 describes a frost-resistant top layer for roads for the resurfacing of concrete, asphalt, brick, flagstone, tile, and wood, based on polyurethanes. It is also possible here to use dissolved, bitumen-based primers.

JP 02088802 describes a repair mixture for roads, where a polyurethane-based primer is applied to the damaged site and a mixture of mineral aggregates and polyurethane prepolymer at maximum packing density is applied to said primer and the material is cured with steam.

The known processes have disadvantages due to a restricted lifetime caused by inadequate adhesion.

SUMMARY OF THE INVENTION

Open-pore asphalts are used increasingly frequently in order to reduce noise, and they also have very good drainage performance; accumulation of water on the surface can therefore be avoided and, by way of example, the risk of aquaplaning can be reduced. However, said open-pore asphalts are very expensive and generally have lifetimes of only about 10 years. Unfortunately, there is at present only an inadequate range of possibilities for the repair of defective top layers of open-pore asphalt, since known open-pore repair materials have only limited adhesion on open-pore asphalts. If repair materials are used that are not open-pore, road noise increases, and water can accumulate on the surface.

It was therefore an object of the present invention to provide a process for repairing top layers for roads, tracks, and other areas used by traffic which gives excellent adhesion to the substrate material and can be carried out simply and rapidly. A particular object of the present invention was to provide a process for repairing open-pore asphalt which provides very good adhesion values and has no effect on drainage capability or the reduction of road noise.

Said object is achieved via a process for repairing top layers for roads, tracks, and other areas used by traffic, by applying an amount of at least 20 g/m$^2$ of a polymeric material to the damaged site, applying an amount of at least 80 g/m$^2$ of a first polyurethane reaction mixture to the polymeric material, and applying, to the first polyurethane reaction mixture, a mixture comprising at least one mineral aggregate and a second polyurethane reaction mixture, and allowing the material to harden.

Polymeric material used preferably comprises a polymeric material with number-average molar mass of at least 500 g/mol, particularly preferably of at least 1000 g/mol. This polymeric material has groups and structures that adhere to rock and/or bitumen, for example acid groups, isocyanate groups, ester groups, acrylate groups, methyl methacrylate groups, phenol groups, phosphate groups, amide groups, epoxy groups, silane groups, soluble bitumen fractions, hydrophobic alkyl groups as side chains or in the main chain, modified fatty acid ester groups, fatty acid derivative groups, hydrophobic polyol groups, or amphiphilic structures, for example structures composed of alkyl chains with C-chain length greater than 4, and of hydrophilic or ionic terminal groups. It is particularly preferable that the polymeric material has urea groups and/or urethane groups, optionally alongside the groups that adhere to rock and/or bitumen.

It is preferable that the polymeric materials used have been dissolved in a suitable solvent. Suitable solvents are generally those which not only have adequate properties for dissolving the polymeric material but also function as solvent or swelling agent for bitumen and evaporate sufficiently rapidly, and do not lead to any lasting damage to the asphalt requiring surfacing. Examples of these solvents are xylene, toluene, trichloroethene, solvent naphtha, modified naphtha, ethylbenzene, oils, gasoline, diesel, acetone, methyl ethyl ketone, and also chlorinated and/or fluorinated solvents, where these can be used individually or in the form of mixtures.

The polymeric materials that can be used in the invention can also be used in the form of reaction mixtures, where the polymeric materials by way of example are produced only after application to the site requiring repair. Isocyanate-containing reaction mixtures can serve as examples of a class of polymeric materials of this type. These reaction mixtures, too, can comprise solvents.

Materials of this type are known and are described by way of example in Waterborne & Solvent Based Surface Coating Resins and Their Applications: Polyurethanes. Wiley, 1998, ISBN 0471978868, 9780471978862. It is preferable to use single-component polyurethanes or acrylate-modified bitumen solutions. These are available commercially by way of example with trade names Mastertop P 690 and Mastertop P 691.

The amount applied of the polymeric material is preferably at least 20 g/m$^2$, with preference from 30 to 300 g/m$^2$, and with particular preference from 50 to 200 g/m$^2$, based in each case on the pure polymeric material, and ignoring, by way of example, solvents optionally comprised.

As an alternative to the application of polymeric material to the damaged site, the surface of the site requiring repair can be activated by flame treatment. This can be achieved by using burners conventionally used on building sites, and must be carried out immediately prior to the application of the polyurethane reaction mixture. However, this is considered to be a less useful alternative because open flames should be avoided on building sites, the underlying layers of bitumen are subjected to thermal damage, and this reduces long-term stability, the method cannot be used with open-pore asphalts without destroying the material, and it is impossible to monitor the duration and uniformity of the flame treatment, and ensure that these are correct and quality assurance therefore becomes almost impossible.

Mineral aggregate used here can comprise any suitable mineral aggregate. However, a factor that should be taken into account is that rock particles used by way of example have grain sizes that give them adequate resistance to impact fracture and adequate resistance to polishing. Another advantageous factor is a high proportion of advantageous grain shape. For abovementioned reasons the types of rock or mineral materials used should preferably have high hardness, an example being greywacke, quartz, granite, or diabase. In certain cases here the mineral material used can by way of example comprise fine-grain rock particles with a flow coefficient of less than 30 s in the form of sand, or else fine-grain rock particles with a flow coefficient of more than 35 s in the form of ground rock, known as broken material. Mineral aggregate used particularly preferably comprises rock particles composed mainly of broken particles. Mineral aggregate selected preferably comprises rock particles with suitable particle size distribution based on the specifications used in bituminous road construction, and varying with the intended use. For the specific case of open-pore asphalt, the intention is to use exclusively or almost exclusively a single class of rock particle with uniform grain size.

It is preferable that the particle-size distribution curve ranges of the mineral aggregate are from 0 to 32 mm, with particular preference from 1 to 16 mm, and in particular from 2 to 11 mm. The proportion by mass of mineral aggregate with grain sizes smaller than 0.063 mm here is preferably smaller than 15% by mass, and the proportion by mass of mineral aggregate with grain sizes greater than 16 mm is preferably smaller than or equal to 10% by mass. Particle-size distribution curves are to be based on the relevant European standard DIN EN 13108.

It is preferable that the asphalt top layer is an asphalt top layer, with particular preference an open-pore asphalt top layer, and that the mixture comprising mineral aggregate and a second polyurethane reaction mixture cures to give an open-pore material. To this end, the size distribution of the particles of the mineral aggregate can correspond to the size distribution of the mineral aggregate usually used for producing open-pore asphalt, so that pores can form. For the filling of flat defective sites in the substrate it is also possible to use classes of grain size that are smaller than those normally utilized for new open-pore asphalt. In particular, the largest grain diameter used should be smaller than the depth of the defective site, so that a relatively stable three-dimensional network is achieved even in the case of flat defects, where the depth of the defect is smaller than the particle-size distribution curve. The blend of the repair material, or the particle-size distribution curve, must be kept sufficiently narrow to achieve a cavity content of at least 10% by volume, preferably at least 15% by volume, particularly preferably at least 20% by volume, and in particular at least 25% by volume, based on the pure mineral material without binders.

The first and the second polyurethane material can be identical or different. "Identical" here means that the same polyurethane-forming substances, such as isocyanates, relatively high-molecular-weight compounds having groups reactive toward isocyanates, and optionally chain extenders, are used in the same ratio to one another in each case. In the event that various other additives are also used, the polyurethanes are nevertheless considered for the purposes of the invention to be identical.

The first and the second polyurethane reaction mixture here are preferably identical.

DETAILED DESCRIPTION OF THE PREFERRED EMBODIMENTS

A polyurethane reaction mixture is a mixture composed of compounds having isocyanate groups and compounds having groups reactive toward isocyanates, where the reaction conversion, based on the isocyanate groups used for the preparation of the polyurethane reaction mixture, is preferably smaller than 90%, particularly preferably smaller than 75%, and in particular smaller than 50%. The compounds having groups reactive toward isocyanates here comprise not only high-molecular-weight compounds, such as polyether- and polyesterols, but also low-molecular-weight compounds, such as glycerol, glycol, and also water. If the reaction conversion, based on the isocyanate group, is greater than 90%, the term polyurethane is used below. A polyurethane reaction mixture here can also comprise further reaction mixtures for the production of polymers. Examples of further reaction mixtures that can be used for the production of polymers are reaction mixtures for the production of epoxides, of acrylates, or of polyester resins. The proportion of further reaction mixtures for the production of polymers here is preferably less than 50% by weight, based on the total weight of the polyurethane reaction mixture. It is particularly preferable that the polyurethane reaction mixture comprises no further reaction mixtures for the production of polymers.

The polyurethane reaction mixture can involve what are known as moisture-curing systems. These comprise isocyanate prepolymers which form polyurethanes or polyureas via addition of water or via humidity, mainly by forming urea groups.

It is preferable to use what are known as two-component systems for the production of the polyurethane reaction mixture. For this, an isocyanate component comprising compounds comprising isocyanate groups, and a polyol component comprising compounds having groups reactive toward isocyanates are mixed in quantitative proportions such that the isocyanate index is in the range from 40 to 300, preferably from 60 to 200, and particularly preferably from 80 to 150.

For the purposes of the present invention, isocyanate index here means the stoichiometric ratio of isocyanate groups to groups reactive toward isocyanate, multiplied by 100. Groups reactive toward isocyanate here means any of the groups which are comprised in the reaction mixture and which are reactive toward isocyanate, and this includes chemical blowing agents, but not the isocyanate group itself.

The polyurethane reaction mixture is preferably obtained by mixing of a) isocyanates with b) relatively high-molecular-weight compounds having at least two hydrogen atoms reactive toward isocyanate, and also optionally c) chain extenders and/or crosslinking agents, d) catalysts, and e) other additives. Compounds particularly preferably used as components a) and b), and also optionally c) to e) are those which lead to a hydrophobic polyurethane reaction mixture and to a hydrophobic polyurethane.

Isocyanates a) that can be used are in principle any of the room-temperature-liquid isocyanates, mixtures and prepolymers having at least two isocyanate groups. Aromatic isocyanates are preferably used, particularly isomers of tolylene diisocyanate (TDI) and of diphenylmethane diisocyanate (MDI), in particular mixtures composed of MDI and of polyphenylene polymethylene polyisocyanates (crude MDI). The isocyanates can also have been modified, for example by incorporating isocyanurate groups and carbodiimide groups, and in particular by incorporating urethane groups. The last-mentioned compounds are prepared via reaction of isocyanates with a substoichiometric amount of compounds having at least two active hydrogen atoms and are usually termed NCO prepolymers. Their NCO content is mostly in the range from 2 to 32% by weight. The isocyanates a) preferably comprise crude MDI, with resultant increase in the stability of the polyurethane obtained.

A disadvantage with the use of aromatic isocyanates is the inadequate colorfastness of the polyurethanes produced therefrom. Marked yellowing of the polyurethanes mostly occurs over the course of time. In applications of the inventive process where high colorfastness is important, it is therefore preferable to use mixtures comprising aliphatic isocyanates and aromatic isocyanates. It is particularly preferable to use exclusively aliphatic isocyanates. In one particular embodiment, an overlayer composed of polyurethane based on an aliphatic isocyanate can be used, in order to protect the top layer based on aromatic isocyanate from yellowing. The overlayer here can also comprise mineral aggregate. Preferred representative compounds are hexamethylene diisocyanate (HDI) and isophorone diisocyanate (IPDI). Because the aliphatic isocyanates have high volatility, they are mostly used in the form of their reaction products, in particular in the form of biurets, allophanates, or isocyanurates. The aliphatic compounds can likewise be reacted and used with any of the conceivable polyols, in particular those listed under b), to give prepolymers.

The relatively high-molecular-weight compounds b) used having at least two hydrogen atoms reactive toward isocyanate are preferably compounds which have hydroxy groups or amino groups as group reactive toward isocyanate. It is preferable to use polyhydric alcohols, since the amino groups are highly reactive and the reaction mixture therefore has to be processed rapidly. Amino groups moreover led to formation of urea groups, which in turn harden to give a rather brittle polyurethane.

The relatively high-molecular-weight, polyhydric alcohols used can by way of example be polyethers or polyesters. Further compounds having at least two hydrogen atoms reactive toward isocyanate groups can be used together with the compounds mentioned. Polyether alcohols are preferred by virtue of their high hydrolysis resistance. These are prepared by conventional and known processes, mostly via an addition reaction of alkylene oxides onto H-functional starter substances. The functionality of the polyether alcohols used concomitantly is preferably at least 3 and their hydroxy number is preferably at least 400 mg KOH/g, preferably at least 600 mg KOH/g, in particular in the range from 600 to 1000 mg KOH/g. They are prepared conventionally via reaction of at least trifunctional starter substances with alkylene oxides. Starter substances that can be used are preferably alcohols having at least three hydroxy groups in the molecule, examples being glycerol, trimethylolpropane, pentaerythritol, sorbitol, and sucrose. Propylene oxide is preferably used as alkylene oxide.

Inventive reaction mixtures preferably comprise compounds having hydrophobic groups. These particularly preferably involve hydroxy-functionalized compounds having hydrophobic groups. These hydrophobic groups have hydrocarbon groups preferably having more than 6, particularly preferably more than 8, and fewer than 100, and in particular more than 10 and fewer than 50, carbon atoms. The compounds having hydrophobic groups can be used as separate component or as constituent of one of components a) to e), for preparation of the reaction mixture. The hydroxy-functionalized hydrophobic compounds preferably involve compounds b) which comply with the definition of the relatively high-molecular-weight compounds having at least two hydrogen atoms reactive toward isocyanates. Component b) here can comprise hydroxy-functionalized hydrophobic compounds or preferably be composed thereof.

The hydroxy-functionalized hydrophobic compound used is preferably a hydroxy-functionalized compound known in oleochemistry, or a polyol known in oleochemistry.

A number of hydroxy-functional compounds that can be used are known in oleochemistry. Examples are castor oil, oils modified using hydroxy groups, e.g. grapeseed oil, black cumin oil, pumpkin seed oil, borage seed oil, soybean oil, wheatgerm oil, rapeseed oil, sunflower oil, peanut oil, apricot seed oil, pistachio oil, almond oil, olive oil, macadamia nut oil, avocado oil, sea buckthorn oil, sesame oil, hazelnut oil, evening primrose oil, wild rose oil, hemp oil, thistle oil, walnut oil, fatty acid esters modified using hydroxy groups and based on myristoleic acid, palmitoleic acid, oleic acid, vaccenic acid, petroselinic acid, gadoleic acid, erucic acid, nervonic acid, linoleic acid, linolenic acid, stearidonic acid, arachidonic acid, timnodonic acid, clupanodonic acid, or cerevonic acid. It is preferable here to use castor oil and its reaction products with alkylene oxides or with ketone-formaldehyde resins. The last-named compounds are marketed by way of example by Bayer AG as Desmophen® 1150.

Another group of polyols which are known in oleochemistry and whose use is preferred can be obtained via ring-opening of epoxidized fatty acid esters with simultaneous reaction with alcohols and optionally subsequent further transesterification reactions. Incorporation of hydroxy groups into oils and fats occurs primarily via epoxidization of the olefinic double bond comprised in these products, followed by reaction of the resultant epoxy groups with a mono- or polyhydric alcohol. The product here of the epoxy ring is a hydroxy group or, in the case of polyhydric alcohols, a structure having a relatively high number of OH groups. Since oils and fats are mostly glycerol esters, parallel transesterification reactions proceed with the abovementioned reactions. The molar mass of the resultant compounds is preferably in the range from 500 to 1500 g/mol. These products are supplied by way of example by Cognis and Altropol.

In one particularly preferred embodiment of the inventive process, the relatively high-molecular-weight compounds b) having at least two hydrogen atoms reactive toward isocyanate comprise at least one polyol known in oleochemistry and at least one phenol-modified aromatic hydrocarbon resin, in particular one indene-coumarone resin. Polyurethane reaction mixtures based on said component b) have a level of hydrophobic properties which is sufficiently high that in principle they can even be hardened under water, or installed during rainfall.

The phenol-modified aromatic hydrocarbon resins used having a terminal phenol group are preferably phenol-modified indene-coumarone resins, and particularly preferably industrial mixtures of aromatic hydrocarbon resins. These products are commercially available and are supplied by way of example by Rutgers VFT AG as NOVARES®.

The OH content of the phenol-modified aromatic hydrocarbon resins, in particular the phenol-modified indene-coumarone resins, is mostly from 0.5 to 5.0% by weight.

The polyol known from oleochemistry and the phenol-modified aromatic hydrocarbon resin, in particular the indene-coumarone resin, are preferably used in a ratio by weight of from 100:1 to 100:50.

Preparation of an inventive polyurethane reaction mixture can use a chain extender c). However, the chain extender c) can be omitted here. However, the addition of chain extenders, crosslinking agents, or else optionally a mixture of these can prove successful for modification of mechanical properties, e.g. hardness.

If low-molecular-weight chain extenders and/or crosslinking agents c) are used, the preparation of polyurethanes can use known chain extenders. These are preferably low-molecular-weight compounds having groups reactive toward isocyanates whose molar mass is from 62 to 400 g/mol, examples being glycerol, trimethylolpropane, known glycol derivatives, butanediol, and diamines. Other possible low-molecular-weight chain extenders and/or crosslinking agents are given by way of example in "Kunststoffhandbuch, Band 7, Polyurethane" [Plastics Handbook, volume 7, Polyurethanes], Carl Hanser Verlag, 3rd edition 1993, chapter 3.2 and 3.3.2.

The polyurethanes used can in principle be prepared without the presence of catalysts d). Catalysts d) can be used concomitantly to improve hardening. The catalysts d) selected should preferably be those that maximize reaction time. It is thus possible that the polyurethane reaction mixture remains liquid for a long period. These catalysts are known to the person skilled in the art. It is also possible in principle, as described, to work entirely without catalyst.

Other conventional constituents can be added to the polyurethane reaction mixture, examples being conventional additives e). These comprise by way of example conventional fillers. The fillers used are preferably the conventional, organic and inorganic fillers, reinforcing agents, and weighting agents known per se. Individual examples that may be mentioned are: inorganic fillers, such as silicatic minerals, e.g. phyllosilicates, such as antigorite, serpentine, hornblendes, amphiboles, chrysotile, metal oxides, such as kaolin, aluminum oxides, titanium oxides, and iron oxides, metal salts, such as chalk, barite, and inorganic pigments, such as cadmium sulfide, zinc sulfide, and also glass. It is preferable to use kaolin (China clay), aluminum silicate, and coprecipitates composed of barium sulfate and aluminum silicate, and also natural and synthetic fibrous minerals, such as wollastonite, metal fibers of various lengths, and in particular glass fibers of various lengths, which may optionally have been coated with a size. Examples of organic fillers that can be used are: carbon black, melamine, rosin, cyclopentadienyl resins, and graft polymers, and also cellulose fibers, polyamide fibers, polyacrylonitrile fibers, polyurethane fibers, polyester fibers based on aromatic and/or aliphatic dicarboxylic esters, and in particular carbon fibers.

If the abovementioned inorganic fillers are used as additives e), their mineral substance constitution preferably differs from that of the mineral aggregates, and they are ignored when determining the grain size distribution of the mineral aggregate.

The inorganic and organic fillers can be used individually or in the form of a mixture, and their amounts comprised in the reaction mixture are preferably from 0.5 to 50% by weight, particularly preferably from 1 to 40% by weight, based on the weight of components a) to e).

The polyurethane reaction mixture should also comprise dryers, such as zeolites. These are preferably added, prior to preparation of the inventive reaction mixture, to the compounds b) having at least two hydrogen atoms reactive toward isocyanate, or to the component which comprises the compounds b) having at least two hydrogen atoms reactive toward isocyanate. Addition of the dryers avoids any increase in the concentration of water in the components or in the reaction mixture, and/or results in absorption, in the raw materials of the formulation, of any water present, and thus avoids formation of foamed polyurethane. Additions preferred for water adsorption are aluminosilicates, selected from the group of the sodium aluminosilicates, potassium aluminosilicates, calcium aluminosilicates, cesium aluminosilicates, barium aluminosilicates, magnesium aluminosilicates, strontium aluminosilicates, sodium aluminophosphates, potassium aluminophosphates, calcium aluminophosphates, and mixtures thereof. It is particularly preferable to use mixtures of sodium aluminosilicates, potassium aluminosilicates, and calcium aluminosilicates in castor oil as carrier substance. Said dryers are not counted as part of the "mineral aggregate".

To improve the long-term stability of the inventive top layers, it is moreover advantageous to add agents to counter attack by microorganisms. Addition of UV stabilizers is also advantageous, in order to avoid embrittlement of the moldings. These additives are known, and examples are given in "Kunststoffhandbuch, Band 7, Polyurethane" [Plastics Handbook, volume 7, Polyurethanes], Carl Hanser Verlag, 3rd edition 1993, chapter 3.4.

The additives E) can moreover comprise conventional coupling agents, preferably based on silanes. Coupling agents used particularly preferably comprise one or more hydroxy- or alkoxyaminosilane compounds of the general formula (I)

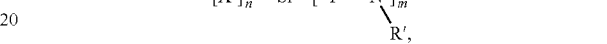

(I)

in which X is mutually independently OH, $CH_3$ or $O[CH_2]_p CH_3$; Y is $[CH_2]_t$, or $[CH_2]_r NH[CH_2]_s$; R and R' is hydrogen or $[CH_2]_r CH_3$; t is from 0 to 10; n is from 1 to 3; p is from 0 to 5; m is 4 minus n, and r and s are mutually independently from 1 to 10. Preferred coupling agent of this type are described by way of example in WO 2010/043644.

It is preferable that the components c), d), and e) are added to the compounds having at least two hydrogen atoms reactive toward isocyanate groups. This blend is often referred to in industry as polyol component.

The ratio in which the isocyanates are combined with the compounds having at least two hydrogen atoms reactive toward isocyanate groups should preferably be such that a stoichiometric excess of isocyanate groups is present.

In one preferred embodiment of the invention, polyurethane reaction mixtures are used which lead to hydrophobic, substantially compact polyurethanes. A polyurethane is termed compact polyurethane if it is substantially free from gas inclusions. The density of a compact polyurethane is preferably greater than 0.8 $g/cm^3$, particularly preferably greater than 0.9 $g/cm^3$, and in particular greater than 1.0 $g/cm^3$.

The weight ratio here of polyurethane reaction mixture to mineral aggregate is preferably between 2:98 and 15:85, particularly preferably between 3:97 and 10:90, and in particular between 4:96 and 8:92.

An inventive mixture comprising mineral aggregate and a second polyurethane reaction mixture can also comprise further additions alongside polyurethane reaction mixture and mineral aggregate. The additions preferably comprise materials which inhibit flow of the binder away from the mineral aggregate. Examples of possible such additions are organic fibers, such as cellulose fibers, or inorganic auxiliaries with thixotropic effect, for example fumed silica, an example being Aerosil® from Evonik. Said auxiliaries with thixotropic effect are not counted as part of the mineral material. It is moreover possible to add polymers which are nowadays used in the bitumen-based systems used. These are especially neoprenes, styrene-butadiene-styrene block copolymers, or a mixture of these, or else any of the other known rubbers and their mixtures. The additions can either be added directly to the mineral mixture in the form of powder or pellets or else dispersed in one of the polyurethane components. It is moreover possible to use reactive additions to render the polyurethane mixture thixotropic in situ. By way of example, monoor polyfunctional amines can be used in proportions of a few percent in the polyol mixture to provide thixotropic properties, examples being polyetherolamines, e.g. Jeffamine from Huntsman or polyetheramines from BASF, diethyltoluenediamine, for example DETDA 80, alkylated methylene-diphenylenediamines, such as Lonzacure® M-CDA, Lonzacure® M-DEA or Lonzacure® M-DIPA, or else a mixture of these agents having thixotropic effect.

The preparation of the inventive mixture comprises mineral aggregate and a second polyurethane reaction mixture is not subject to any restriction. By way of example, it can be prepared in mixers to which the mineral aggregate is introduced, and the starting components for the preparation of the polyurethane reaction mixture can, for example, be introduced by spraying. Additions to be added here are preferably optionally added to the mixture at the respective advantageous juncture. By way of example, therefore, these may be in solution or dispersion in one of the components of the reaction mixture, for example in one of components a) to e), and may be added with these to the mixture. The additions can also be separately added to the mixture. By way of example, cellulose fibers can be added at a juncture such that these are present in homogeneous dispersion in the mixture for the production of top layers, but are not irreversibly damaged by the mixing procedure. The inventive mixture here for the production of top layers can by way of example be produced by the process described in DE 19632638. It is likewise possible, for example, to begin by preparing the polyurethane reaction mixture and then to mix this with the mineral aggregate and optionally with the further additions. In another embodiment, the mineral aggregate can optionally first be mixed with some of the components of the reaction mixture, for example with components b) and, if present, c) to e), and then the components not yet present, for example component a), can be added in a mixer. The proportion of the second polyurethane reaction mixture is preferably from 1 to 10% by mass, particularly preferably from 2 to 8% by mass, and in particular from 3 to 6% by mass, based on the total weight of mineral aggregate and of second polyurethane reaction mixture.

It is preferable that the site requiring repair in the top layer is cleaned prior to application of the polymeric material. This can be achieved by way of example by sweeping or blowing. It is equally possible to use a low-pressure or high-pressure wash to clean the site requiring repair, but in that case it should appear visually dry prior to application of the polymeric material. Residual moisture represented by moisture in the deeper sublayers of the open-pore material is not problematic. Once the polymeric material has been applied, it is preferable that any solvent present is allowed to escape, for example by evaporation. In the event that the polymeric material has been applied in the form of a reaction mixture, the first polymeric material can be applied directly, or preferably the reaction to form the polymeric material is allowed to proceed to an extent such that the average molar mass of the polymeric material is preferably at least 500 g/mol.

An amount of at least 80 g/m$^2$, preferably from 100 g/m$^2$ to 1000 g/m$^2$, and particularly preferably from 120 to 500 g/m$^2$, of the first polyurethane reaction mixture is then applied to the polymeric material.

The mixture comprising mineral aggregate and a second polyurethane reaction mixture is applied to the first polyurethane reaction mixture or to the polyurethane obtained via complete reaction of the first polyurethane reaction mixture. It is preferable that the mixture comprising mineral aggregate and a second polyurethane reaction mixture is applied while the first polyurethane reaction mixture has not yet reached its gelling time or cobwebbing time. The gelling time here is the juncture at which the storage modulus is greater than the loss modulus in rheological measurement at room temperature. For the purposes of this invention, an approximation to the gelling time is determined by way of the cobwebbing time. For this, a wooden bar is repeatedly placed on the surface of the polyurethane reaction mixture. The cobwebbing time has been reached as soon as removal of the wooden bar from the surface results in fiber formation.

Once the mixture of the invention for producing top layers has been applied, this is smoothed to the level of the surrounding road surfacing. It can then also be covered with scattered sand, preferably when there is no involvement of an open-pore asphalt subject to acoustic requirements. Prior to the scattering process, the mixture can optionally be carefully compacted, in order to achieve intermeshing of the mineral substances, for example by gentle tamping or by using a lightweight road roller conventionally used in road construction. Any depression below the surrounding road surfacing is to be avoided.

The resultant repair material is then allowed to harden, optionally with use of heat. If polyurethane material used comprises a moisture-curing material, it is also possible to use steam for the curing process.

The invention further provides a repair kit for repairing top layers for roads, tracks, and other areas used by traffic, comprising a polymeric material, optionally a first polyurethane reaction mixture, and a second polyurethane reaction mixture, and also optionally further additions and mineral aggregate.

The various sublayers can be applied by operatives manually, by spraying, rolling, or spreading. Application by machinery is equally possible, via adaptation of finishers, of automated spray equipment, and of other necessary equipment.

The process of the invention for repairing top layers for roads, tracks, and other areas used by traffic leads to a long-lasting renewal of the top layer, since very strong adhesion develops between the asphalt and the repair material used. Areas used by traffic here comprise all of the areas used by traffic which have bound top layers, for example taxiways and take-off and landing runways at airports, and also sidewalks or cycleways. A possible use here is indeed for repairing open-pore asphalt, where the repair in turn forms an open-pore element which is not inferior to the previous top layer, in particular to the previous open-pore asphalt top layer, either in terms of sound-deadening or in terms of drainage capability. When the repaired site is compared with conventional repair mixtures it also exhibits high frost resistance and low susceptibility to formation of longitudinal grooves, and is more rapidly available to carry traffic at usual speeds, since the desired skid resistance is present directly after hardening. The skid resistance of the repair mixture of the invention can moreover be adjusted prior to the final hardening of the repair mixture, for example by covering the surface with scattered sand or scattered rock-derived material. Finally, the color and lightness of the repaired site can be adapted via colorant additions or via selection of the coloring of the mineral material used so as to be precisely appropriate to the surrounding material.

EXAMPLES

Examples will be used below to illustrate the invention.
Polyol component: Elastopave 6551/102, comprising a castor-oil-based hydroxy-functional oleochemical component, trifunctional chain extender, reactive amine to provide thixothropic properties, and antifoam Isocyanate: Polymeric diisocyanatodiphenylmethane (PMDI)

Primer 1: Mastertop P 691 from BASF; single-component polyurethane adhesion promoter in solvent Primer 2: Mastertop P 690 from BASF; polyacrylate-bitumen-based single-component adhesion primer Preparation of Polyurethane Reaction Mixture and Repair Mixture 100 parts by weight of the polyol component of the Elastopave 6551/102 system were mixed intimately with 83.7 parts by weight of isocyanate to give a polyurethane reaction mixture. 5% by weight of said polyurethane reaction mixture are mixed with 95% by weight of 2/4 diabase to give a repair mixture. The repair mixture of comparative example 5 comprised 8% by weight of polyurethane reaction mixture and 92% by weight of 2/4 diabase.

The adhesion experiments used sample sheets made of AC 16 BS asphalt binder material with dimensions 320×260×50 mm. In the first step, the asphalt sheets were optionally coated with primer in accordance with the table. After air-drying, a second sublayer of binder is optionally applied, and then immediately coated with the repair mixture to a height of 1 cm and subjected to slight mechanical compression. After the hardening process, test specimens were produced by using a 5 cm hollow drill, and these were used to determine the adhesion of the repair mixture on the asphalt binder material by a method based on TP Asphalt StB T81, but with a ram diameter of 47.5 mm, differing from that in the test specification mentioned. The table collates the amounts used of primer, and also the results of adhesion measurement. The value stated here in relation to the determination of adhesion was determined by taking the average from 4 test specimens.

The examples show that particularly high adhesion of the repair mixture on the asphalt binder material is obtained by using primers with a polymeric material and with a polyurethane reaction mixture.

The invention claimed is:

1. A process for repairing a top layer of a road, a track, or an area used by traffic, the process comprising:
    applying an amount of at least 20 g/m$^2$ (grams per square meter) of a polymeric material to a damaged site to form a polymeric material layer,
    applying an amount of at least 80 g/m$^2$ of a first polyurethane reaction mixture to the polymeric material to form a first polyurethane reaction mixture material layer on said polymeric material layer,
    applying, to the first polyurethane reaction mixture layer, an aggregate mixture comprising a mineral aggregate and a second polyurethane reaction mixture, wherein a proportion of the second of polyurethane reaction mixture is from 1 to 10% by weight based on a total weight of mineral aggregate and second polyurethane reaction mixture, and
    allowing the polymeric material, the first polyurethane reaction mixture, and the second polyurethane reaction mixture to harden,
    wherein said polymeric material layer and said first polyurethane reaction mixture layer do not contain mineral aggregate.

2. The process according to claim 1,
    wherein the top layer is an open-pore asphalt top layer, and
    the aggregate mixture comprising said mineral aggregate and said second polyurethane reaction mixture hardens to give an open-pore material.

TABLE

| Experiment | 1st primer | 2nd primer | Repair mixture: proportion of polyurethane reaction mixture | Weight per unit area of primer 1 [g/m$^2$] | Weight per unit area of primer 2 [g/m$^2$] | Adhesion [MPa] |
|---|---|---|---|---|---|---|
| Comparison 1 | — | — | 5% | | | No adhesion |
| Comparison 2 | Polyurethane reaction mixture | — | 5% | 168 | — | 0.5 |
| Comparison 3 | Primer 1 | — | | 144 | | 0.3 |
| Comparison 4 | Primer 2 | — | 5% | 180 | — | 0.6 |
| Comparison 5 | Primer 2 | — | 8% | 144 | — | 0.7 |
| Inventive example 1 | Primer 2 | Polyurethane reaction mixture | 5% | 144 | 144 | 0.7 |
| Inventive example 2 | Primer 2 and polyurethane reaction mixture (in each case 50% by weight) | — | 5% | 144 | 0 | 0.8 |
| Inventive example 3 | Primer 2 | Polyurethane reaction mixture | 5% | 156 | 276 | 0.9 |
| Inventive example 4 | Primer 1 | Polyurethane reaction mixture | 5% | 132 | 144 | 1.0 |

3. The process according to claim 1,
wherein the gelling time of said first polyurethane reaction mixture has not been reached when the aggregate mixture comprising said mineral aggregate and said second polyurethane reaction mixture is applied.

4. The process according to claim 1,
wherein the polymeric material has a group that adheres to rock, bitumen, or both.

5. The process according to claim 4,
wherein the polymeric material has a polyurea bond, a polyurethane bond, or both.

6. The process according to claim 1,
wherein the first polyurethane reaction mixture and the second polyurethane reaction mixture are obtained by a process comprising mixing of
a) a) an isocyanate with
b) a compound comprising at least two hydrogen atoms reactive toward isocyanate, and also optionally
c) a chain extender, a crosslinking agent, or both,
d) a catalyst, and
e) an additive.

7. The process according to claim 6,
wherein the compound b) comprises a hydroxy-functional compound comprising a hydrophobic group.

8. The process according to claim 7,
wherein the hydroxy-functional compound comprises a hydroxy-functional compound known in oleochemistry.

9. The process according to claim 7,
wherein the compound b) comprises a hydroxy-functional compound known in oleochemistry and a phenol-modified aromatic hydrocarbon resin.

10. The process according to claim 1, comprising applying 30-300 g/m$^2$ (grams per square meter) of said polymeric material to said damaged site.

11. The process according to claim 1, wherein the first polyurethane reaction mixture and the second polyurethane reaction mixture are identical.

12. The process according to claim 1, wherein the first polyurethane reaction mixture and the second polyurethane reaction mixture are different.

13. The process according to claim 1, comprising applying an amount of 100-1000 g/m$^2$ of said first polyurethane reaction mixture to the polymeric material.

14. The process according to claim 10, comprising applying an amount of 100-1000 g/m$^2$ of said first polyurethane reaction mixture to the polymeric material.

15. The process according to claim 14, wherein the first polyurethane reaction mixture and the second polyurethane reaction mixture are identical.

16. The process according to claim 15, wherein the gelling time of said first polyurethane reaction mixture has not been reached when the aggregate mixture comprising said mineral aggregate and said second polyurethane reaction mixture is applied.

17. The process according to claim 1, wherein the proportion of the second polyurethane reaction mixture is from 2 to 8% by mass based on the total weight of mineral aggregate and second polyurethane reaction mixture.

18. The process according to claim 14, wherein the proportion of the second polyurethane reaction mixture is from 2 to 8% by mass based on the total weight of mineral aggregate and second polyurethane reaction mixture.

19. The process according to claim 16, wherein the proportion of the second polyurethane reaction mixture is from 2 to 8% by mass based on the total weight of mineral aggregate and second polyurethane reaction mixture.

* * * * *